March 3, 1931. G. NENNA 1,794,532
AUTOMOBILE LIFTING DEVICE
Filed March 21, 1930 2 Sheets-Sheet 1
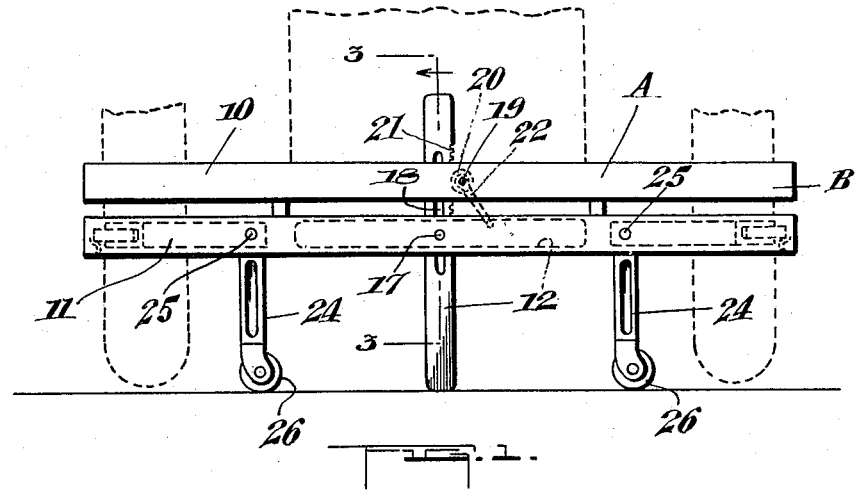
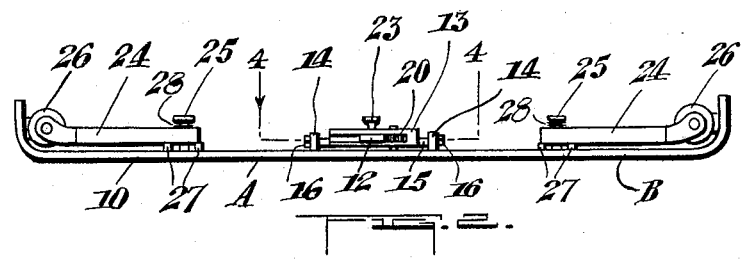
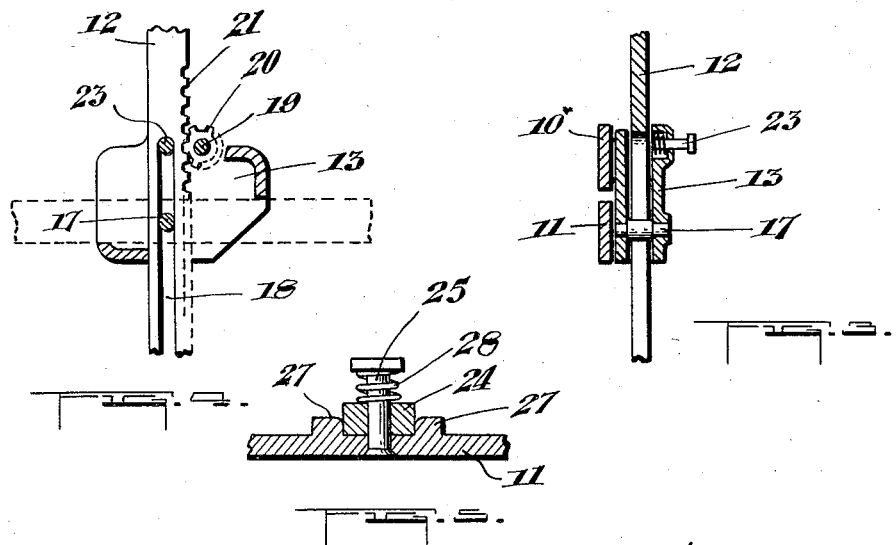
INVENTOR.
GENNARO NENNA.
BY Smart & Biggar
ATT'YS March 3, 1931.  G. NENNA  1,794,532
AUTOMOBILE LIFTING DEVICE
Filed March 21, 1930   2 Sheets-Sheet 2
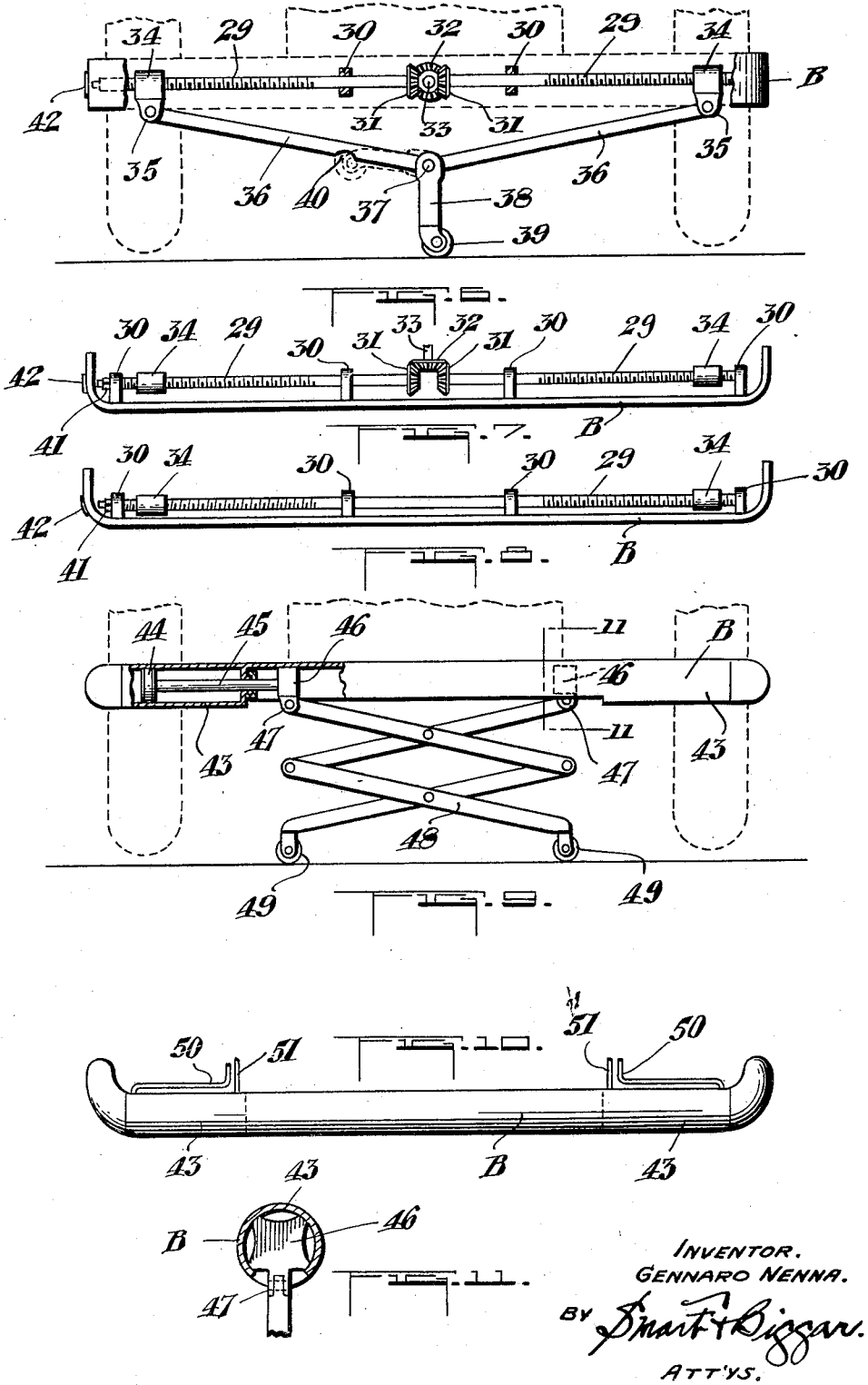
INVENTOR.
GENNARO NENNA.
BY Smart&Biggar
ATT'YS.

Patented Mar. 3, 1931

1,794,532

UNITED STATES PATENT OFFICE

GENNARO NENNA, OF OWEN SOUND, ONTARIO, CANADA, ASSIGNOR TO CHRISTOS GEORGAS, OF OWEN SOUND, ONTARIO, CANADA

AUTOMOBILE LIFTING DEVICE

Application filed March 21, 1930. Serial No. 437,877.

This invention relates to improvements in automobile lifting devices and an object of the invention is to provide a convenient and simple form of lifting device of this character including means for providing relative shifting of the raised automobile from its initial position, for instance in the case of parking.

A further object of the invention is to provide a device of this character in the form of a combination unit.

With these and other objects in view the invention consists essentially of a lifting element preferably operatively attached to the bumper of an automobile with which is associated means for permitting shifting of the automobile when it has been elevated so that the position of the car can be readily changed to permit parking and the like, as more fully described in the present specification and illustrated in the accompanying drawings which form part of the same.

In the drawings, Figure 1 is a front elevation of one form of my invention.

Figure 2 is a plan view of Figure 1.

Figure 3 is a section on the line 3—3 of Figure 1.

Figure 4 is a section on the line 4—4 of Figure 2.

Figure 5 is a sectional detail of one form of means for retaining the supports in rigid vertical position which is also common to the lifting member.

Figure 6 illustrates a modified form of lifting element with the bumper partly broken away.

Figure 7 is a plan view of the form illustrated in Figure 6.

Figure 8 is a plan view of a further modified form.

Figure 9 is a front elevation of a lifting element operated by means of pistons showing the bumper partly in section.

Figure 10 is a plan view of the bumper construction employed in Figure 9.

Figure 11 is a section on the line 11—11 of Figure 9.

Referring more particularly to the drawings, A indicates the unit as a whole including the bumper B composed of two parts 10 and 11. A lifting element 12 in the form of a standard is operatively associated with the bumper and mounted thereon by means of a suitable bracket 13 which is rigidly connected to the upper section 10 of the bumper by means of the lugs 14 and the bolt members 15 integrally formed on the casting and protruding through orifices formed in the lugs 14, the bolt members being retained by means of the nuts 16.

The casting 13 is in the form of a shell having a passageway therethrough and the lifting element or standard 12 is adapted to pass therethrough and is free to move relative to the casting. A pivot pin 17 is provided in the casting traversing the passageway and is adapted to also pass through a longitudinal slot 18 in the standard so as to still permit of relative vertical movement of the standard and also provide for a pivoting or swinging of the standard about the pin 17 for a purpose referred to hereinafter.

Any suitable means is provided for actuating the standard to raise an automobile but preferably I employ a crank shaft 19 provided with a pinion 20 which is adapted to mesh with the rack 21 in one side of the standard, the crank shaft 19 being operable through the medium of the crank 22 which may be readily formed removable from the shaft.

A locking bolt 23 is also provided on the casting or shell 13 and adapted to extend into the slot 18 when the standard is in vertical position and thereby retain the standard rigidly in that position. This bolt, however, is movably mounted on the casting and may be withdrawn when desired to permit swinging of the standard.

Secured to the lower section 11 and on each side of the lifting element are the supports 24 which are pivoted on the lower section as at 25 and provided at their lower ends with the casters 26. These supports, it will be noted, are long enough so that when they are in contact with the ground the automobile frame and wheels are elevated from the ground. The supports are adapted to co-operate with the lifting element and on operating the crank 22 when the lifting element is in normal vertical position it will readily be seen that the car will be elevated. The supports 24, which are normally carried in horizontal position at the rear of the bumper, as illustrated in Figure 1, are then turned to vertical position and the automobile lowered so that the casters 26 contact with the ground and support the car in elevated position. The car then may be pushed to move and swing on the casters and thereby may be easily shifted into a parking space which operation entails a great deal of work under existing conditions since considerable scheming has to be done. Similarly to the standard 12 the supports 24 are provided with means for holding them rigid in vertical position.

One form of retaining means is shown in Figure 5 in which integral lugs or bosses 27 are formed on the lower section 11 of the bumper providing a space therebetween sufficient to accommodate the width of the supports 24. The pivot pin 25 is adapted to extend through the centre of this space and a spring 28 is positioned on the pivot pin and exerts pressure upon the supports 24 and the lugs 27. It is only necessary to exert pressure against the spring to remove the standards from the space between the lugs so as to permit them to be swung about their pivot points to normal inoperative position on the back of the bumper. In normal inoperative position it will be noted that the standard 12 is carried in alignment with the standards 24 behind the lower section 11 of the bumper, the standard being swung about the pivot pin 17 after the locking pin 23 has been disengaged.

In Figures 6 and 7 a modified form of this invention includes the bumper B upon which are mounted the cross shafts 29 through the medium of the supports 30. The cross shafts 29 are formed with threading of similar nature and provided on their inner ends with the bevel gears 31 which are adapted to mesh with the bevel gear 32 carried by the operating shaft 33 which is connected to the engine drive so that the cross shafts 29 may be rotated under power of the vehicle if desired. The shafts, it will be noted, rotate in opposite directions.

Screw-threaded collars 34 are mounted on the shafts and adapted to be operated by the screw-threading of the shafts. These collars are provided with downwardly extending lugs 35 and the arms 36 of a lifting element are pivotally connected thereto. The arms in themselves are pivotally connected together as at 37 and a standard or support 38 is pivotally associated with the arms 36 through the medium of the pivotal connection 37. The support is provided with a caster 39 and a recess 40 may be provided in one arm to accommodate the caster when the standard or support 38 is turned to normal inoperative position, as illustrated in Figure 6.

The end of the support, it will be noted, is bifurcated to extend on each side of the arms 36 and by reason of the fact that the shaft mounting of the caster is offset from the vertical plane through the axis of the pivotal connection 37 in addition to the fact that the web of the standard adjacent its bifurcated end will contact with one of the arms 36 when in the position illustrated in Figure 6 in operation the support will be held in rigid vertical position. One of the cross shafts 29 may also be provided with a squared end 41 protruding through the support 30 and registering with an orifice 42 or the like in the end of the bumper so that a crank may readily be inserted therethrough to provide manual means for turning the cross shaft.

On rotation of the cross shafts 29 the collars 34, through the medium of the threading on the cross shafts, will travel inwardly or outwardly on these shafts according to the direction of rotation. Correspondingly the arms 36 will move on their pivots to raise the car through the medium of the support 38. The car may then be shifted similarly as in the case of the structure first described.

In Figure 8 the gears have been eliminated and a construction illustrated which is adapted to be manually operated by a crank arm. In this form the rod 29 is oppositely threaded at each end. The lifting element may also be readily operated by pneumatic or hydraulic means.

A form which the unit may take in this instance is illustrated in Figures 9, 10 and 11 in which the bumper B is provided with the cylinders 43 in which the pistons 44 are adapted to operate. The piston rods 45 extend through one end of the cylinder and are connected at their free ends to collars 46 provided as in Figure 6 with lugs 47. The lifting element 48, here shown as a lazy tongs mechanism, is pivotally connected to the lugs and this element is also provided with casters 49 for the purpose previously described. Conduits 50 and 51 are provided for conveying the pressure medium to the cylinders and the collars 46 as illustrated in Figure 11 are formed with a four point bearing surface with the bumper to keep friction down to a minimum.

Of course, instead of the lazy tongs mechanism a lifting element in the form of that illustrated in Figure 6 may be employed or other convenient forms which are readily found in an assembly of that character. The operation is of course similar to that already described.

It will be realized that a very complete and simple combination unit has been provided which will eliminate a lot of difficulty in the parking of automobiles and may be efficiently operated with a minimum of effort.

Of course the lifting element might be applied to other parts of the car such as the axle but my invention is chiefly directed to the combination bumper unit which is readily applicable to any car.

The invention in the main, in view of the foregoing, covers a lifting device for automobiles including a lifting element operable to raise the vehicle and auxiliary supporting means for supporting the vehicle in raised position, the supporting means including rollers or the like for permitting movement of said vehicle upon said supports.

In Figure 1 the auxiliary supporting means is in the form of supports 24 provided with casters 26. In Figure 6 the lifting element includes the arms 36 and operating mechanism therefor, the auxiliary support being constituted by the standard 38 and caster 39 whereas in the form illustrated in Figure 9 the lazy tongs mechanism constitutes the lifting means while the casters constitute the auxiliary support.

The combination unit therefore provides a very convenient device which may be attached to the automobile without difficulty and may be operated without obstruction which would be the case in mounting lifting means on other parts of the car.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:—

1. A combination unit for automobiles comprising a bumper normally designed to be mounted on the automobile, a lifting element operatively connected with the bumper, means for operating said lifting element to raise the automobile, and auxiliary means for supporting the vehicle in raised position and for permitting movement of said vehicle on said auxiliary means.

2. A combination unit for automobiles comprising a bumper normally designed to be mounted on the automobile, bracket members formed on the bumper, a lifting element operatively connected with the bumper through said brackets, means for operating said lifting element to raise the vehicle, auxiliary supporting means for the automobile adapted to support said automobile in raised position, and roller means associated with said auxiliary supporting means for permitting shifting movement of the raised automobile.

3. A device as claimed in claim 2 in which means is provided for retaining the auxiliary supporting means in rigid vertical position.

4. A combination unit for vehicles and the like comprising a bumper normally designed to be mounted on the vehicle, brackets on said bumper, a lifting element operatively connected with said bumper through the medium of said brackets, crank means for raising and lowering the lifting means, auxiliary supporting means for supporting the vehicle in raised position, and roller means associated with the auxiliary supporting means for permitting shifting movement of said raised vehicle.

5. A combination unit for vehicles and the like comprising a bumper normally designed to be mounted on the vehicle, a lifting element operatively connected with said bumper, a bracket in the form of a casting rigidly secured to said bumper and formed with a passageway therethrough adapted to slidably receive said lifting element, means for retaining said element in rigid vertical position, crank means for raising and lowering said element, auxiliary supporting means operatively associated with the bumper adapted to support the vehicle in raised position, and means associated with said supporting means for permitting shifting movement of said raised vehicle.

6. The device as claimed in claim 5 in which the lifting element and auxiliary supporting means are pivotally mounted on the bumper and normally carried behind the bumper in horizontal position.

In witness whereof I have hereunto set my hand.

GENNARO NENNA.